United States Patent
Gross

(10) Patent No.: US 8,959,167 B2
(45) Date of Patent: *Feb. 17, 2015

(54) SOCIAL NETWORK SITE RECOMMENDER SYSTEM AND METHOD

(71) Applicant: Facebook, Inc., Menlo Park, CA (US)

(72) Inventor: John Nicholas Gross, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/908,982

(22) Filed: Jun. 3, 2013

(65) Prior Publication Data

US 2013/0268609 A1 Oct. 10, 2013

Related U.S. Application Data

(63) Continuation of application No. 13/682,484, filed on Nov. 20, 2012, now Pat. No. 8,458,276, and a continuation of application No. 13/193,477, filed on Jul. 28, 2011, now Pat. No. 8,321,519, and a continuation of application No. 11/856,182, filed on Sep. 17, 2007, now Pat. No. 7,996,456.

(60) Provisional application No. 60/826,268, filed on Sep. 20, 2006.

(51) Int. Cl.
G06F 15/16 (2006.01)
H04L 12/58 (2006.01)
G06Q 10/10 (2012.01)
G06F 15/82 (2006.01)

(52) U.S. Cl.
CPC .............. *H04L 51/04* (2013.01); *G06Q 10/107* (2013.01); *G06F 15/825* (2013.01)
USPC ............. 709/206; 709/203; 709/207; 725/32; 725/34

(58) Field of Classification Search
USPC ........................ 709/206, 207, 203; 725/32, 34
See application file for complete search history.

(56) References Cited

U.S. PATENT DOCUMENTS

| | | | |
|---|---|---|---|
| 2004/0030918 A1* | 2/2004 | Karamchedu et al. | 713/200 |
| 2004/0215726 A1* | 10/2004 | Arning et al. | 709/206 |
| 2006/0167940 A1* | 7/2006 | Colton et al. | 707/104.1 |
| 2007/0050455 A1* | 3/2007 | Yach et al. | 709/206 |
| 2007/0294428 A1* | 12/2007 | Guy et al. | 709/245 |

* cited by examiner

Primary Examiner — Frantz Jean
(74) Attorney, Agent, or Firm — Baker Botts L.L.P.

(57) ABSTRACT

Particular embodiments evaluate a plurality of messages. Each message may be associated with an author. Information may be logged for each message, such as information associated with the author, information associated with one or more designated recipients of the message, and time information. Correlation values may be determined for one or more sets of designated recipients based on at least a portion of the logged information. Particular embodiments may determine an association amongst a plurality of users over time. The determination may be based on the correlation values. At least one of the plurality of users may comprise at least one of the designated recipients.

21 Claims, 4 Drawing Sheets

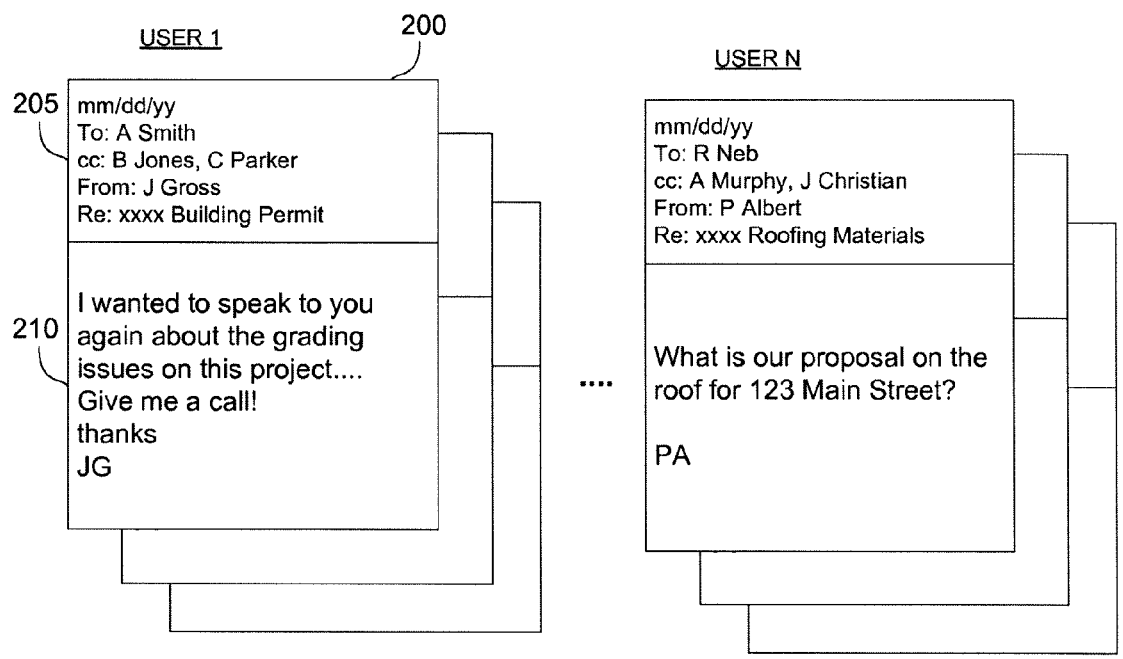

|    | A         | B         | C           | D           | E           | ... | X           |
|----|-----------|-----------|-------------|-------------|-------------|-----|-------------|
| A  |           | $CR_{AB}$ | $CR_{AC}$   | $CR_{AD}$   | $CR_{AE}$   |     | $CR_{AX}$   |
| B  | $CR_{BA}$ |           | $CR_{BC}$   | $CR_{BD}$   | $CR_{BE}$   |     | $CR_{BX}$   |
| .. |           |           |             |             |             |     |             |
| AB |           |           | $CR_{(AB)C}$ | $CR_{(AB)D}$ | $CR_{(AB)E}$ |     | $CR_{(AB)X}$ |
| ABC |          |           |             | $CR_{(ABC)D}$ | $CR_{(ABC)E}$ |   | $CR_{(ABC)X}$ |
| BC | $CR_{(BC)A}$ |       |             | $CR_{(BC)D}$ | $CR_{(BC)E}$ |    | $CR_{(BC)X}$ |
| .... |         |           |             |             |             |     |             |

400

SOCIAL NETWORK SITE RECOMMENDER SYSTEM AND METHOD

RELATED APPLICATION DATA

The present application claims priority to and is a continuation of U.S. patent application Ser. No. 13/682,484, filed Nov. 20, 2012, which is a continuation of U.S. patent application Ser. No. 13/193,477, filed Jul. 28, 2011 and issued as U.S. Pat. No. 8,321,519, which is a continuation of U.S. patent application Ser. No. 11/856,182, filed Sep. 17, 2007 and issued as U.S. Pat. No. 7,996,456, which in turn claims the benefit under 35 U.S.C. 119(e) of the priority date of U.S. Provisional Application No. 60/826,268 filed Sep. 20, 2006—all of which are hereby incorporated by reference herein.

The application is also related to the following applications incorporated by reference herein:

Electronic Message System Recipient Recommender, Ser. No. 11/856,202; and

Web Page Link Recommender; Ser. No. 11/856,191

FIELD OF THE INVENTION

The present invention relates to document distribution systems which incorporate some form of recipient control or collaborative filtering.

BACKGROUND

Recommender systems are well known in the art. In one example, such systems can make recommendations for movie titles to a subscriber. In other instances they can provide suggestions for book purchases, or even television program viewing. Such algorithms are commonplace in a number of Internet commerce environments, including at Amazon, CDNOW, and Netflix to name a few, as well as programming guide systems such as TiVO.

Traditionally recommender systems are used in environments in which a content provider is attempting to provide new and interesting material to subscribers, in the form of additional products and services. In some cases (see e.g., U.S. Pat. No. 6,493,703 incorporated by reference herein) recommenders have been employed for the purpose of informing members of an online community of content and/or preferences of other members. Nonetheless the use of recommenders has not been extended fully to other areas including email or document distribution which could benefit from such systems.

SUMMARY OF THE INVENTION

An object of the present invention, therefore, is to reduce and/or overcome the aforementioned limitations of the prior art.

DESCRIPTION OF THE DRAWINGS

FIG. 2 shows an example of typical kinds of documents which can be processed in accordance with the teachings of the present invention;

FIG. 3 illustrates an exemplary table of recipient tabulations compiled in accordance with the present invention;

DETAILED DESCRIPTION

Figure 1:
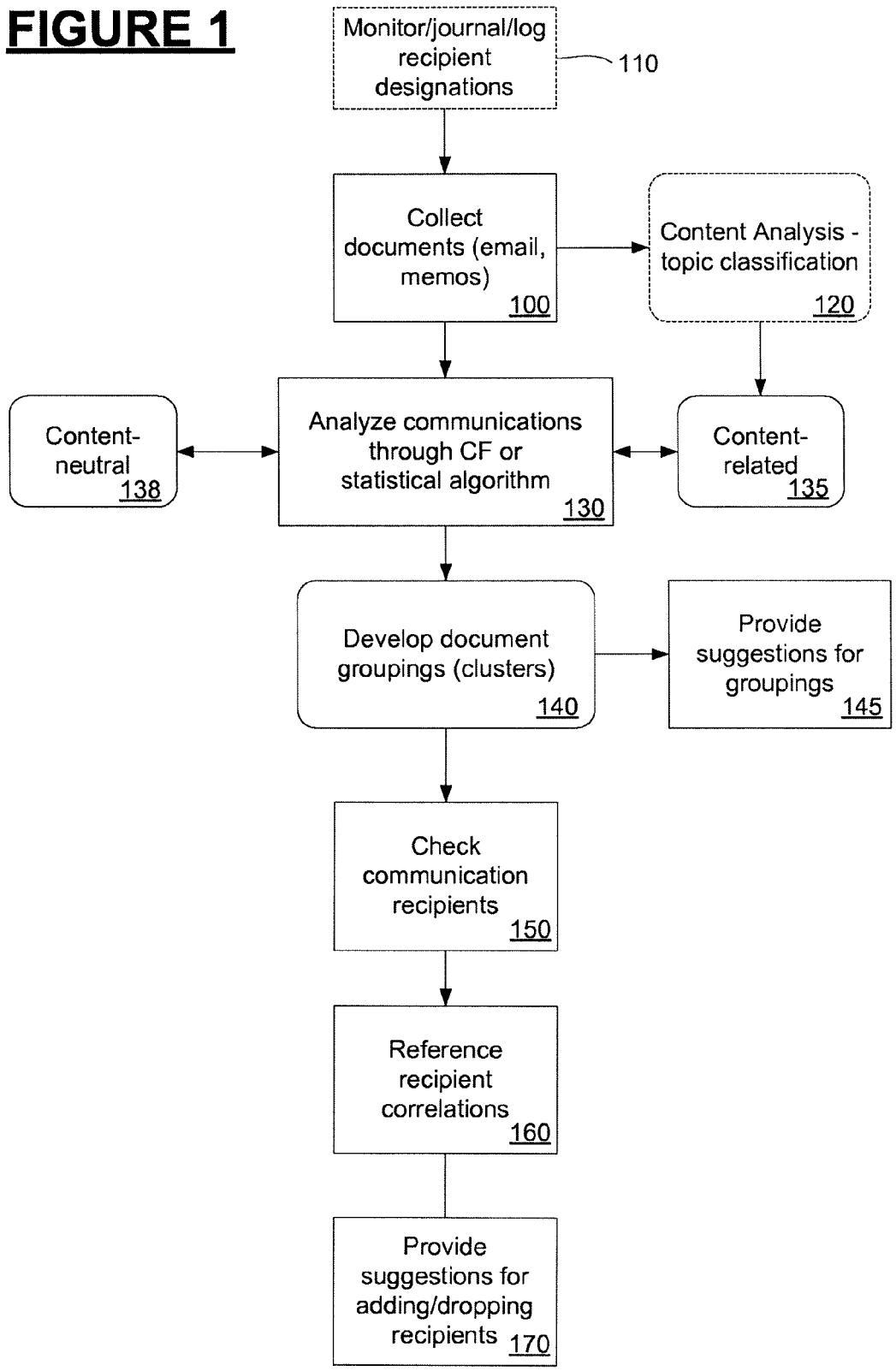
FIG. 1 is an illustration of a document distribution process of the present invention.

FIG. 1 illustrates an example of a preferred embodiment of a document distribution process of the present invention. Communications such as emails, instant messages, memorandums, etc., are collected and compiled into a review corpus or reference set at step 100. If data is available, the sequence of which recipients are identified is also compiled as well as part of step 110. In other words, if an author of a document selects a sequence of recipients A, B, C, this can be catalogued along with the document itself.

Similarly another optional step 120 can be implemented as desired to classify the content of each document into predefined selected topics/categories. The topics/categories can be defined according to the particular application but for a personal email application might include such topics as Politics, Jokes, Family, Office, Project Specific, Friends, Current Event, Sports, movies, Tech Gadgets and other desired classifications. It will be apparent that these are just examples presented for didactic reasons and other topics could be derived from examining actual content.

The documents are then analyzed in accordance with one or more statistical algorithms or collaborative filter algorithms in step 130. In particular, the identities of the recipients are tabulated, sorted and correlated as noted further below, so that the system effectively learns the recipient relations employed by the user in question. Again while the present example is given in the context of analyzing a single user's communications, it should be apparent that the principle can be extrapolated (as described below) to determine the aggregate behavior of larger collections of individuals, including entire social networks, members of an electronic message board, or other similar online groups.

Moreover the invention could be extended into search engine applications, in which the documents could be web pages, and the recipients could be navigable links to other pages. In this latter implementation the goal of the invention could be to assist third parties in identifying potential sites which are predicted to eventually adopt another link, or which can be contacted to specifically add such link based on the statistical analysis disclosed herein. Thus the content of specific pages can be predicted in advance to some extent based on their expected compliance/adoption of links shared in common with other web pages directed to similar topics.

Some online advertising systems also operate by examining the content of a web page to serve appropriate ads. By knowing in advance which links a site is likely to adopt, the content of a target page can be predicted to some extent. Similarly by identifying one or more targets of such links, and measuring or evaluating an adoption rate of new pages for links to such targets, a prediction can be made as well of the future page rank/popularity of a particular site as well. These predictions of the content of the page, and the projected inbound links to a page can be exploited for marketing purposes to identify potential advertising partners.

This same principle could be applied to message board members as well, to help identify potential new favorite members for correspondence, reviewing materials, etc. For example a posting made to a board/site directed to a particular stock/topic may be analyzed to determine if a recommendation should be made to include the same in a second stock board or other section of the site.

Content providers (including bloggers and RSS feed suppliers) who supply articles and other media intended for natural persons can also use the invention to identify desirable outlets and other publication sites for their materials on a topic by topic basis. Other examples will be apparent.

As depicted in steps 135 the analysis can be done by incorporating content related information or it can be one without reference to content as noted in step 138. In some instances it may be preferable to determine clusterings in accordance with specific categories/topics, so the invention may be used in such fashion.

The documents are then sorted and grouped in step 140 to determine the relationships between the various recipients. At this point the system has determined, for example, that the user tends to communicate on topic A to recipients X, Y and Z more often than with any other set of recipients. Other significant relationships are also determined and stored for the user, so that they can be referenced rapidly later on during creation/distribution of new document or communication.

Thus at step 145, a first output of the present invention is a list of proposed groupings that is generated automatically for the user. These groupings can be presented to the user at any convenient time, again based on topic if desired, in a manner that must be done manually at this time with conventional email systems. For example, an email system used by AOL permits members to designate groups of email addresses which can be reference by a short descriptor (i.e., "Pegasus Project Members") but such lists must be manually compiled, and cannot be automatically updated. Accordingly this is one significant benefit of the invention in an email application.

At a later time when the user is composing a document or email message, the designated recipients are checked at step 150. The system then checks the relevant recipient correlations based on the initial set identified by the user at step 160, based on some threshold which can be either explicitly specified or automatically determined. Thus at the end of this step, the system has identified other predicted recipients (or sites in the case of content providers) who may be good candidates for distribution of the communication or document.

At step 170 the list of proposed potential new recipients is provided expressly to the user. This allows the user to gain the benefit of an automated process which helps to remind him/her or relationships which they may have forgotten whilst composing the document in question. This saves time as well from having to manually review email/IM lists to identify appropriate recipients. The invention can be integrated as an optional opt-in features as part of a conventional email/IM program. In turn the email/IM program could be executing on any of a variety of platforms, including conventional PCs as well as cellphones, PDAs, etc.

Note that the invention is also useful because it can help out catch instances where a specified recipient explicitly identified by the user is in fact not really a suitable or appropriate candidate for the content. This is a common problem with many automated email programs which attempt to predict an email/IM recipient after receiving a few letters of the person's name, and it is easy to make a mistake from not noticing that the recipient is not actually the intended target. For example in an AOL application, the system will automatically select an email address after receiving a few letters of a name; so after typing JOE the system may automatically select joesmith instead of joelgrey. Unless the user is vigilant, this can give rise to potentially important communications being sent to the wrong recipients.

Consequently at step 170 another potential output of the system is an alert or other indicator to bring to the user's attention that a particular recipient may be in error.

FIG. 2 illustrates a typical set of documents which are processed in accordance with the present invention. A user's emails 200 include typical header information 205, such as date, topic and a set of recipients. The body 210 includes the content portion of the email. Again, in a search engine context the header and body information would be identified and extracted in accordance with that subject matter, so that instead of "recipients" the page may include target URL links to other websites, Internet accessible documents, etc.

As seen in FIG. 2 another user's emails/documents could be similarly analyzed as part of a larger analysis of a single organization, a social networking group, an online message group, or any other well-known and accessible member set. This would allow aggregating of statistical information on recipient clustering, so that for example when a first user selects recipients A, B, C for an email on topic X, the system could reference other users who specified A, B, C and D for topic X. This allows the invention to act in the form of a collaborative filtering mode, if desired, for some applications. Again it is likely that in large organizations many users will not know the identity of particular persons who should receive particular communications, and the present invention can help fill this knowledge gap. Similarly when new users come into a system, it will be easier for them to come to the attention of similarly minded users in a community.

FIG. 3 shows an example of the kind of tabulation that can be used in the present invention. Each entry in the table represents a detected recipient set and a measured frequency of use. The table in FIG. 3 is optionally tied to a particular content label as well, such as those shown generally therein. The content labels can be generated by a conventional artificial intelligence routine, such as a natural language engine or the like. For this particular user and topic, the breakdown shows that the recipient set {BCD} is most heavily used, followed by {ABC}, {AB} etc.

Figures 4, 5:
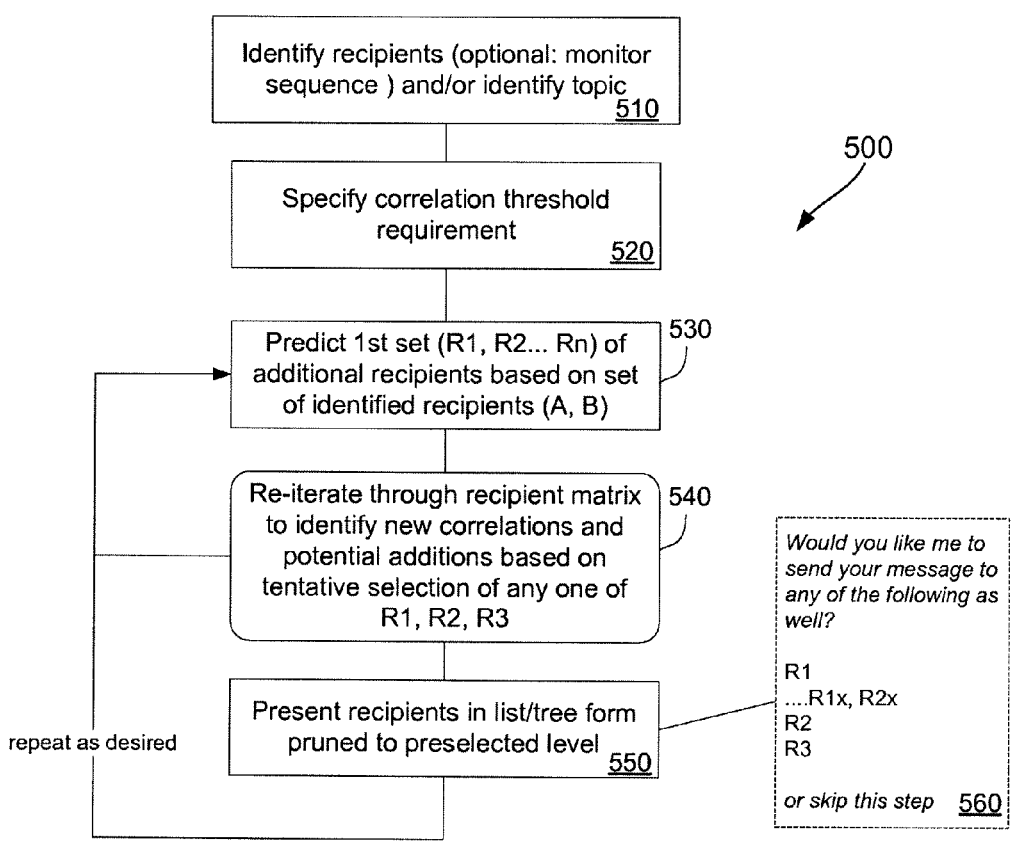
FIG. 4 illustrates an exemplary matrix of recipient correlations compiled in accordance with the present invention.
FIG. 5 illustrates an exemplary recommendation method in accordance with the present teachings.

The raw tabulation is then processed into correlation scores within a matrix 400 shown in FIG. 4. Each entry in the matrix is a Bayesian probability value representing the relationship between the column and row entries. For example, the value $CR_{AB}$ represents the measured correlation between the existence of A as a recipient on a document and the existence of B as well on such document. If it is determined that A and B are usually paired together on communications, then this value will be relatively high compared to other values in the matrix. The value of CRAB can thus be used to determine whether the system should recommend that B also be designated as a recipient upon detecting that a user has explicitly identified A as a recipient.

The row entries in the matrix are preferably determined by examining the identified recipient sets found in the training/reference set of documents. In this manner larger supersets of recipients can also be classified and correlated. For example the sets {A, B} and {C, B} may both have low correlation values. But {AB, C} may have a higher correlation value, suggesting that the trio is commonly designated as a single recipient set. By exploring and exploiting such determinations the system can identify valuable suggestions for recommendations of new recipients in larger collections of recipients. The combination of {A, B} is thus simply treated artificially as a single recipient in this variation.

The column entries represent the correlations to other users, or, if desired, collections of recipients as suggested above. Since the latter may become unwieldy from a processing perspective it may be simpler in some cases to use single person entries in the matrix columns. However since the information is relatively static and be compiled for each user in non-real time it may be preferable nonetheless to include such information. Thus it may be useful to include information on correlations between larger collections of recipients, so that a value CR(ABC)DE could denote the relationship between two sets having multiple recipients. Using the present invention therefore one can create recipient clusters or groups on a topic-by-topic basis.

Note that in most instances where users identify a single recipient this is most likely a private communication that is not intended to be disseminated to others. For such reason the invention can be adjusted if desired so that it only analyzes multi-recipient based documents, and thus is only automatically invoked when there are multiple recipients in a designated set.

More specifics on certain operational steps 500 of the preferred embodiment are shown in FIG. 5. A user identifies an initial set of recipients, such as {A, B} at step 510. Alternatively, in some embodiments, a topic of the document may be derived (again using some kind of conventional classifier or natural language engine), and a set of predicted recipients generated without input from the user, based solely on prior correlations to such subject matter. The specific sequence of recipient additions can also be journaled to see, for example, if the user picks A, then B, or the user picks B and then A more frequently. This sequence data can also be captured and stored as data in matrix 400, so that a lookup to {A,B} may yield different data than {B, A}.

Suppose further as a typical example, that the system has measured 100 emails involving multiple recipients in which the user has identified {A,B} as recipients. Suppose further that there are 3 other detected entities: C, D and E that occur in multiple recipient scenarios. Further assume that the measured recipient sets are as follows: AB=20; ABCD=10; ABD=10; ABCE=15; ABC=30; ABE=15.

At step 520 a correlation threshold/confidence requirement is used to allow some control over the recommendations given, so that the user is not given every possible suggestion, but instead is only given certain ones which exceed a predetermined predicted value. The value can be determined experimentally, or can be specified by the user his/her self if desired.

Given a new document with explicit recipients at step 530 the system will generate a prediction set {R1, R2, etc.} based on the designated pair AB and correlation values in matrix 400. In this instance, if a threshold is otherwise satisfied, it will likely conclude that C is another likely candidate as a recipient, since in 55/100 cases in which the pair {AB} appears, C also appears. So the $1^{st}$ prediction set would include C alone. The other recipients (D, E) are not highly correlated to {A,B} so they are not suggested—in this example—as candidates.

At step 540, if the user elects to add C to the recipient list, however, this can also affect a prediction by the system which is elaborated below. Thus, to some extent it may make sense in some situations to calculate in advance not only the likely probable additions to any list, but also the secondary additions which are likely to be generated as a result of the first round of changes. Thus the system anticipates that the user is likely to include C in the distribution list, and re-calculates new potential additions based on an expected addition of C into the list.

Again in many instances these values can be pre-computed for common combinations so that the system can respond very quickly to any actual changes made. Furthermore since the recipients are usually designated at the beginning of the creation of the document, and there is a delay before distribution as the user creates the substance, it is possible to use such time to calculate the various possible permutations and options for distribution of the document.

Accordingly at step 540 the system may further determine that F and G are highly correlated to the recipient set {A, B, C} and will tentatively add these as potential recommendations as well. Subsequently at step 550 the system presents the identified recipients and potential new recipients in some convenient visual form, such as specific additions to the cc: list, or as proposals highlighted in a tree form, etc.

An example is shown in box 560 in which the primary recommendation for R1 (in this case C) is identified, along with secondary recommendations F, G under that. Other examples for presenting the recommended recipients will be apparent to those skilled in the art. Again, assuming the user makes specific elections to add or delete certain recipients (or prospective sites in the case of content/links) the system can re-iterate through the loop and provide additional suggestions. Alternatively the user can opt out as shown in FIG. 5.

In larger communities of users in which more collaborative information is desired, the matrix 400 can by synthesized with reference to aggregate compilations tabulated over several users. In this manner a particular document distributor designating a set of recipients {D1, D2} may unexpectedly discover that a particular recipient X is commonly associated by other members with his/her designees. This enhances information flow, cooperation, social interaction, etc., which would otherwise be unavailable without automated support and data mining performed by the present invention.

Other personal data and metadata associated with the individuals can also be exploited to predict inclusions and exclusions of members. For example explicit profile data, demographic data and behavior data can be analyzed to improve prediction accuracy for recipient designations. This affords an advantage in situations where new recipients are introduced to the process. Such persons may have little or no explicit content which can be mined for identification of recipient designations. However they may have sufficient personal data which can be analyzed both expressly and through semantic linking to identify corresponding topics for which they may be potential candidates for inclusion or exclusion from message groups.

In other instances the profiles, demographics and behavior data of such individuals can be compared to existing individuals to identify potential pairings. For example if person A is typically linked in and designated as a recipient for a topic X, and person B has characteristics which overlap/match those of A, then B may also be suggested as a recipient for topic X messages in the absence of prior designation data. Stated another way, individuals can be clustered and associated by topic through any number of data associations. By correlating the topic of the proposed communication to such other parameters certain types of users can be integrated more rapidly into the system and afforded an opportunity to be involved in key exchanges.

Similarly for new topics which have not been addressed before the present invention could use any number of well-known semantic analysis techniques to identify related pre-existing topics which are likely to serve as useful initial proxies. By analyzing one or more proxy recipient groups the new topic can be set up with an initial designation set that can be altered dynamically later based on observing actual exchange behavior in the community.

All of the above techniques, as well as other well-known procedures, could be used to improve the cold-start phenomenon associated with new data in a recommender system. One other approach of course is to study preexisting email/message groupings already compiled by specific users, in a manner that is typically used to evaluate bookmarks made by individuals. By correlating a new user to an existing user (using some form for collaborative filtering well known in the art) the latter's groupings can be used to bootstrap recommendations for recipients for the new user.

In other embodiments it may be desirable to allow selected users/operators of a computing system to access the topic/recipient clusterings for purposes of identifying and compiling information networks of individuals having interest and/or expertise in particular knowledge domains. These automated clusterings can be then be formed into predefined mailing groups, and individuals could then be able to determine and elect to be included in such groups at their own request/discretion.

The sequence selection data for recipients can also be aggregated community-wide and then tabulated and analyzed to determine weightings for proposed recipients. For example if person A is frequently selected among the top N recipients for topic X, this also can be used to influence a prediction (or a relative priority/position on a list of predictions) for another user when a message associated with topic X is presented for consideration.

Similarly the recipient sequence data can be analyzed to influence or determine individual/topic associations and clusterings. This aspect of the invention exploits the fact that prominent persons within an organization are likely to be well-known to their peers. By tapping into the collective consciousness/behavior of a group the invention can quickly determine those persons deemed to be most knowledgeable, relevant or important with respect to particular subjects. The sequences can also be studied, of course, to identify perceived immediate and logical pairings between individuals—such as in cases where A and B are frequently presented in proximity to each other in designated sequences.

In embodiments which use such approach it may be desirable to avoid problems of improperly influencing a recipient sequence by virtue of how suggestions are presented. To address this the invention can also present lists of persons in random order/position. By avoiding any influence on the author of the document/message, a truer representation of the user's mental impressions of topic/recipient relevance can be isolated and determined.

For some embodiments it may be desirable to include a time based component as well for weighting the correlations. In the table of FIG. 4, an additional field with a time stamp can be introduced to track such data. Tracking this data can have the effect of amplifying or attenuating relationships over time based on some desired profile or mathematical curve. For example more recent associations between entities may be weighted higher to reflect changing or evolving behaviors within an organization. In some applications the opposite may be appropriate, namely increasing the weighting as a function of the age of the correlation to denote a longer and perhaps more meaningful relationship. The particular choice of time weightings will be a function of the application environment and desired behavior. It may be desirable to include temporal data for both a first instance of an association between two individuals for a particular topic, as well as a most recent instance to track trends.

This approach in essence considers the evolution of the associations over time. That is, for a given topic at a given time, the number of associations between A and B on topic X may be the same as A and C. Thus, for purposes of a recommendation, the two would otherwise be given a similar prediction. However, based on a time varying analysis it could be determined that the associations for A and B are spread out over a time period that is substantially greater than that for A and C. This additional information can be used to alter (increase/decrease) a correlation or prediction for such entities/topic. Moreover by considering these associations, and their associated time stamps, the present invention can afford additional insights into the mindset of an organization and the identity of appropriate persons for particular topics of information.

Other trends can be gleaned from the time stamp data, including the rise or fall of popularity/relevance of certain individuals within certain topic domains. This data again can be used to analyze and classify skill sets and personnel traits within an organization. Other examples will be apparent to those skilled in the art.

Figure 6:
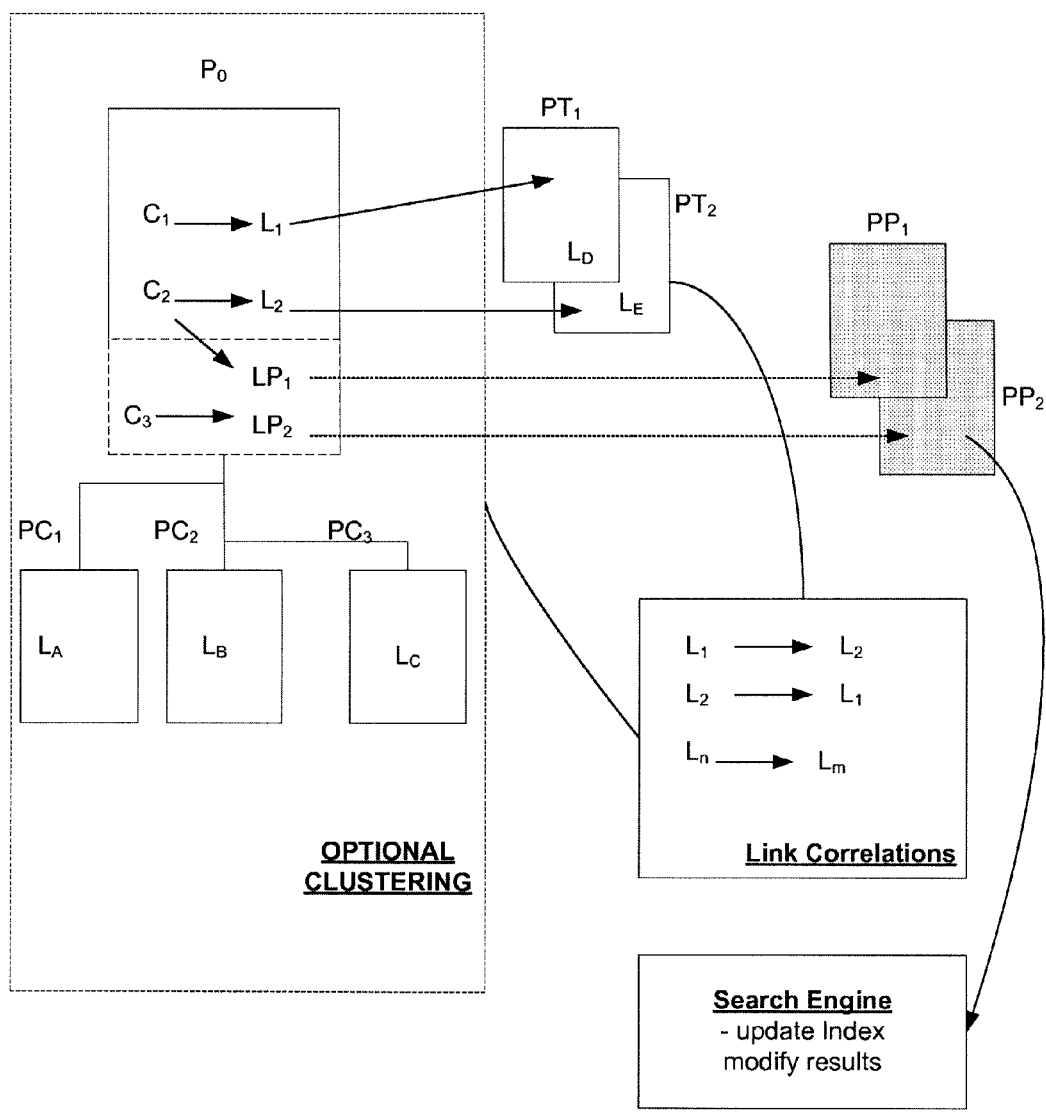
FIG. 6 illustrates an exemplary method for adjusting a search engine rank or listing result in accordance with the present teachings.

A search engine embodiment of the invention is shown in FIG. 6. The content of the web page $P_0$ is compared directly to a set of other content related web pages $P_{C1}$, $P_{C2}$, etc, either through explicit textual/multimedia content references, and/or through semantic relationships. For example a page directed to snow skiing could be analyzed and determined to be related to other pages dealing with manufacturers of particular brands of skis, sites discussing snow boarding, winter sports, sporting equipment, etc.

Another set of pages which can be examined are derived from any preexisting links $L_1$, $L_2$, etc. based on corresponding content $C_1$, $C_2$, etc. on $P_0$ which point to target pages $PT_1$, $PT_2$, etc. The aforementioned content related pages $P_{CS}$, $P_{C2}$ and preexisting target pages $PT_1$, $PT_2$, are then examined and correlated (in any desired fashion) to glean potential additional target links for web page $P_0$. A list of potential links $LP_1$, $LP_2$ for potential target pages $PP_1$, $PP_2$, etc. are then presented on a topic-by-topic basis for the content of the page in question. In some cases each sentence, fact, or concept of the web page P0can be analyzed to locate a suitable link based on the corresponding content found in the other pages. The invention can also be used as a tool, therefore, for new web page developers to quickly and easily identify potential new and relevant links for their sites.

Moreover in a search engine context, a ranking of target electronic pages $PP_1$, $PP_2$ could be modified based on an expected adoption of a link to such one or more related pages by page $P_0$ under investigation. In other words, a form of pseudo-link could be calculated from page $P_0$ to the target pages, based on an assumption that the owner of the page, were he/she knowledgeable of the authority of the target pages $PP_1$, $PP_2$, would (or should) otherwise agree and consent to a link citation to the target page for a particular reference associated with content on the page. Based on prior behavior of page $P_0$, and other related pages, it may be useful to predict an expected adoption rate in fact of such predicted links.

The pseudo-links can be used to modify the search engine index, and to modify search engine results. In some instances and for some topics pseudo-links can be given equal weight to an actual link, and used to modify a page ranking as done for example in the well-known Google based algorithm. In other cases it may be desirable to weight the pseudo-links with a variable effect, to compensate or adjust for the fact that they are not yet links in fact. For other applications it may be useful to simply modify the search engine result listings page by the WWW electronic page and/or other pages.

In this fashion the present invention exploits both semantic aspects of content on the web, as well as aspects of collaborative/corroborative filtering performed on a page basis. If a set of web pages $P_0$, $P_1$, $P_2$, etc., share a certain common set of links $\{L_1, L_2 \ldots L_M\}$ and one of such web pages adds a new link (say $P_1$ adds $L_X$), a search engine operation could be based on the assumption that there is a reasonable likelihood that the other pages will add the same link at a later time. Thus, clustering of web pages can be performed in a manner commonly done with individuals in recommendation systems.

Similarly, linking behavior can be tabulated to identify corroborative relationships, such as in the example where a citation to link L1 is heavily correlated to a link L2, and so on. So for those instances where a page P0 cites to the first link, a recommendation can be made to add link L2 as well. Other examples will be apparent to those skilled in the art.

The age of the new link could be studied and used, as well, to modify the prediction. For example if the link is to an older page, the prediction may be reduced since it is likely that it was already known, considered and rejected. Conversely a brand new page might be unknown to most persons, and therefore have a greater chance of adoption. By using semantic matching between content, the set of comparable web pages and related links can be expanded to flesh out and fill in missing link data. Thus the implicit or inherent links of a page can be identified and tabulated for greater precision in a search engine, resulting in a form of semantic search engine with greater coverage as well.

The inclusion of a recommendation engine, either by collaborative filtering, corroborative filtering, or other well-known technique helps to automatically fill in/predict missing link data between otherwise previously unrelated web pages. Other user profile data could be incorporated of course, such as by monitoring user bookmarks, surfing behavior, etc., for purposes of deriving related links, and the invention is not limited in this respect.

It will be understood by those skilled in the art that the above are merely examples and that countless variations on the above can be implemented in accordance with the present teachings. A number of other conventional steps that would be included in a commercial application have been omitted, as well, to better emphasize the present teachings.

It will be apparent to those skilled in the art that the modules of the present invention, including those illustrated in the figures can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a portion of the hardware and software will be contained locally to a member's computing system, which can include a portable machine or a computing machine at the users premises, such as a personal computer, a PDA, digital video recorder, receiver, etc.

Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art. Such code, routines, etc. may be stored in any number of forms of machine readable media. The above descriptions are intended as merely illustrative embodiments of the proposed inventions. It is understood that the protection afforded the present invention also comprehends and extends to embodiments different from those above, but which fall within the scope of the present claims.

What is claimed is:

1. A method comprising:
   providing, by one or more processors, an electronic document;
   receiving, by the one or more processors, an initial set of designated recipients for the electronic document from a user;
   evaluating, by the one or more processors, content of the electronic document to identify at least one topic associated with the content;
   comparing, by the one or more processors, data associated with at least one recipient in the initial set to data associated with one or more other individuals to identify one or more other individual with characteristics that match or overlap with the at least one recipient;
   suggesting, by the one or more processors, the identified individuals as an additional recipient for the electronic document; and
   forming, by the one or more processors, a final set of designated recipients.

2. The method of claim 1 wherein the electronic document is compared to prior documents generated by the user or a set of other users related to the user to identify distribution recipients of the prior documents.

3. The method of claim 2, wherein prior document distribution designations of the prior documents are correlated to identify relationships between recipients and to predict recipients to be removed from the final set of designated recipients.

4. The method of claim 1, further comprising correlating characteristics of the identified individuals and documents associated with the user.

5. The method of claim 1 wherein a first set of the identified individuals determined to be correlated above a first specified threshold value with the initial set of designated recipients.

6. The method of claim 5, wherein a second set of the identified individuals determined to be correlated above a second specified threshold value with the first set of additional recipients.

7. The method of claim 1, wherein a sequence used by the user for entering the initial set of designated recipients is monitored to determine a correlation to prior sequences used by the user.

8. The method of claim 1, wherein the data comprises profile data, demographic data, or behavior data.

9. The method of claim 1, wherein at least one of the identified individuals is determined to have a relationship with the user based on prior document distribution designations of prior documents generated by the user or a set of other users related to the user.

10. One or more computer-readable non-transitory storage media embodying software that is operable when executed to:
    provide an electronic document;
    receive an initial set of designated recipients for the electronic document from a user;
    evaluate content of the electronic document to identify at least one topic associated with the content;
    compare data associated with at least one recipient in the initial set to data associated with one or more other individuals to identify one or more other individual with characteristics that match or overlap with the at least one recipient;

suggest the identified individuals as an additional recipient for the electronic document; and form a final set of designated recipients.

11. The media of claim 10, wherein the electronic document is compared to prior documents generated by the user or a set of other users related to the user to identify distribution recipients of the prior documents.

12. The media of claim 11, wherein prior document distribution designations of the prior documents are correlated to identify relationships between recipients and to predict recipients to be removed from the final set of designated recipients.

13. The media of claim 10, further comprising correlating characteristics of the identified individuals and documents associated with the user.

14. The media of claim 10, wherein a first set of the identified individuals determined to be correlated above a first specified threshold value with the initial set of designated recipients.

15. The media of claim 14, wherein a second set of the identified individuals determined to be correlated above a second specified threshold value with the first set of additional recipients.

16. A system comprising:

one or more processors; and a memory coupled to the processors comprising instructions executable by the processors, the processors operable when executing the instructions to: provide an electronic document; receive an initial set of designated recipients for the electronic document from a user;

evaluate content of the electronic document to identify at least one topic associated with the content;

compare data associated with at least one recipient in the initial set to data associated with one or more other individuals to identify one or more other individual with characteristics that match or overlap with the at least one recipient;

suggest the identified individuals as an additional recipient for the electronic document; and form a final set of designated recipients.

17. The system of claim 16 wherein the electronic document is compared to prior documents generated by the user or a set of other users related to the user to identify distribution recipients of the prior documents.

18. The system of claim 17, wherein prior document distribution designations of the prior documents are correlated to identify relationships between recipients and to predict recipients to be removed from the final set of designated recipients.

19. The system of claim 16, wherein a sequence used by the user for entering the initial set of designated recipients is monitored to determine a correlation to prior sequences used by the user.

20. The system of claim 16, wherein the data comprises profile data, demographic data, or behavior data.

21. The system of claim 16, wherein at least one of the identified individuals is determined to have a relationship with the user based on prior document distribution designations of prior documents generated by the user or a set of other users related to the user.

* * * * *